(12) United States Patent
Hashimoto et al.

(10) Patent No.: US 8,436,885 B2
(45) Date of Patent: May 7, 2013

(54) APPARATUS FOR GENERATING SPATIALLY MODULATED LIGHT AND IMAGE RECORDING APPARATUS

(75) Inventors: Yoshimi Hashimoto, Kyoto (JP); Yoshikazu Kataoka, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 106 days.

(21) Appl. No.: 12/888,929

(22) Filed: Sep. 23, 2010

(65) Prior Publication Data

US 2011/0069136 A1    Mar. 24, 2011

(30) Foreign Application Priority Data

Sep. 24, 2009   (JP) .................. 2009-219465

(51) Int. Cl.
*B41J 2/47* (2006.01)
(52) U.S. Cl.
USPC .......................................... 347/239; 347/255
(58) Field of Classification Search ............ 347/230, 347/239, 241, 255, 256; 359/290
See application file for complete search history.

(56) References Cited

U.S. PATENT DOCUMENTS

| | | | |
|---|---|---|---|
| 4,278,981 A * | 7/1981 | Hill et al. ................ | 347/240 |
| 7,589,755 B2 * | 9/2009 | Tamaki ................... | 347/239 |
| 7,710,628 B2 | 5/2010 | Morizono et al. | |
| 2002/0024740 A1 | 2/2002 | Hashimoto | |
| 2003/0179434 A1 | 9/2003 | Hirawa | |
| 2006/0209310 A1 | 9/2006 | Muenz et al. | |
| 2008/0316748 A1 | 12/2008 | Egger | |

FOREIGN PATENT DOCUMENTS

| | | |
|---|---|---|
| JP | 2000-168136 | 6/2000 |
| JP | 2001-311874 | 11/2001 |
| JP | 2002-72132 | 3/2002 |
| JP | 2002139845 A * | 5/2002 |
| JP | 2002-280325 | 9/2002 |
| JP | 2004-4525 | 1/2004 |
| JP | 3522133 | 2/2004 |
| JP | 2007-178882 | 7/2007 |
| JP | 2008-90264 | 4/2008 |

OTHER PUBLICATIONS

European Search Report issued Dec. 29, 2010 in connection with corresponding European Patent Application No. 10 177 154.1.

* cited by examiner

*Primary Examiner* — Hai C Pham
(74) *Attorney, Agent, or Firm* — Ostrolenk Faber LLP

(57) ABSTRACT

A light from a laser light source (11) is collected at a position of a slit (125a) in a vertical direction by a first optical system (12a) to form an intermediate image which is long in a horizontal direction corresponding to an arrangement direction of light modulator elements. An undesired light such as side lobes which appear on the both sides of the intermediate image in the vertical direction is blocked by a slit (125a) and the intermediate image is reformed by a second optical system (12b), to direct a liner illumination light onto the spatial light modulator (13). Thus, in a state where moving ribbons are sagged and first order diffracted lights are emitted in a light modulator element, it is possible to prevent a zeroth order light from being emitted from both end portions of ribbons, to thereby enhance contrast of the signal light.

16 Claims, 8 Drawing Sheets

… (1) …

APPARATUS FOR GENERATING SPATIALLY MODULATED LIGHT AND IMAGE RECORDING APPARATUS

TECHNICAL FIELD

The present invention relates to a technique for generating a spatially modulated light with using a spatial light modulator of diffraction grating type.

BACKGROUND ART

Developed has been a light modulator element of diffraction grating type which is capable of changing the depth of grating by alternately forming fixed ribbons and moving ribbons on a substrate with a semiconductor device manufacturing technique and sagging the moving ribbons relatively to the fixed ribbons. In such a diffraction grating, light amounts of regularly reflected light and diffracted light are changed by changing the depth of grooves. It is proposed that, in Japanese Patent Application Laid-Open No. 2004-4525, Japanese Patent Application Laid-Open No. 2002-72132, and Japanese Patent No. 3,522,133, a spatial light modulator in which light modulator elements are arranged in a line is applied to an image recording technique.

Meanwhile, since the moving ribbons are sagged in a state where their both end portions are supported, an amount of sagging of the both end portions becomes smaller than that of other portions of the moving ribbons. Therefore, if light is incident on the both end portions, light modulation by the light modulator element is failed to cause decrease in contrast or the like. To solve this problem, a linear illumination light with a very narrow width has to be accurately irradiated along the center of the line where the light modulator elements are arranged. Generation of such linear illumination light from a laser light requires expensive lenses with high quality which should be located in an optical system from a laser light source to light modulator elements, and this increases the manufacturing cost of an image recording apparatus.

SUMMARY OF INVENTION

It is a main object of the present invention to generate a linear illumination light which is suitable for a spatial light modulator of diffraction grating type without using expensive optical elements and to provide an apparatus for generating a spatially modulated light with high performance at low cost.

An apparatus for generating a spatially modulated light according to the invention comprises a laser light source, a spatial light modulator having a plurality of light modulator elements which are arranged in an element arrangement direction, and an illumination optical system for generating a linear illumination light from a light emitted from the laser light source, the linear illumination light being directed onto the plurality of light modulator elements. Each light modulator element of the plurality of light modulator elements has strip-like moving reflective surfaces and strip-like fixed reflective surfaces which are elongated in a direction perpendicular to the element arrangement direction and are alternately arranged in the element arrangement direction. The moving reflective surfaces are sagged in a state where both end portions of the moving reflective surfaces are supported, and each light modulator element changes between a state of emitting a zeroth order light and a state of emitting first order diffracted lights, to generate a group of signal lights, each of which is a zeroth order light or first order diffracted lights, from the plurality of light modulator elements, as a spatially modulated light. The illumination optical system comprises a first optical system, a slit member, and a second optical system in this order. The first optical system forms an intermediate image of the laser light source at an intermediate image position between the laser light source and the spatial light modulator, the intermediate image being formed with respect to a vertical direction which is a direction perpendicular to a horizontal direction corresponding to the element arrangement direction and perpendicular to an optical axis, the intermediate image being long in the horizontal direction. The slit member is positioned at the intermediate image position and has a slit extending in the horizontal direction, the slit member blocking an undesired light which appears on both sides or one side of the intermediate image in the vertical direction. The second optical system reforms the intermediate image onto the spatial light modulator with respect to at least the vertical direction with using a light passing through the slit, to generate the linear illumination light.

In the invention, the undesired light of the intermediate image is blocked by the slit member to thereby acquire a spatially modulated light with high contrast. Since a beam width relative to each light modulator element in the direction perpendicular to the element arrangement direction is limited, the form of the beam is made uniform and the linear illumination light with high quality is acquired to thereby obtain a recorded image with high quality.

The present invention is also intended for an image recording apparatus for recording an image on a recording material.

These and other objects, features, aspects and advantages of the present invention will become more apparent from the following detailed description of the present invention when taken in conjunction with the accompanying drawings.

DESCRIPTION OF EMBODIMENTS

Figure 1:
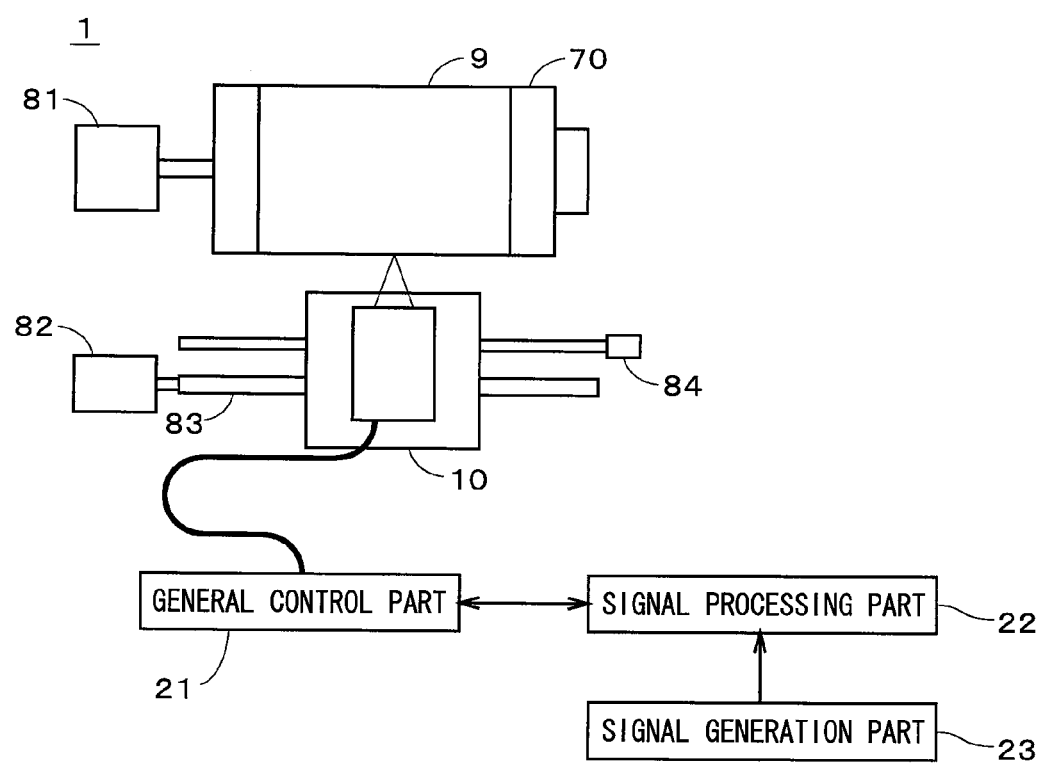
FIG. 1 is a view showing an image recording apparatus.

FIG. 1 is a view showing a constitution of an image recording apparatus 1 in accordance with a preferred embodiment of the present invention. The image recording apparatus 1 has an optical head 10 which is an apparatus for generating a spatially modulated light and a holding drum 70 for holding a recording material 9 on its outer surface. A spatially modulated light from the optical head 10 is relatively moved while the light is applied (irradiated) onto the recording material 9 to record an image on the recording material 9 (i.e., an image is recorded by light irradiation). As the recording material 9, used are a printing plate, a film for forming the printing plate and the like, for example. A photosensitive drum for plateless printing may be used as the holding drum 70 and in this case, it is understood that the recording material 9 corresponds to a surface of the photosensitive drum and the holding drum 70 holds the recording material 9 as a unit.

The holding drum 70 is rotated about a central axis of its cylindrical surface by a motor 81 and the optical head 10 thereby travels relatively to the recording material 9 at a constant speed in a main scan direction. The main scan direction is a direction crossing an arrangement direction of positions irradiated with light from a plurality of light modulator elements later discussed. The optical head 10 is movable by a motor 82 and a ball screw 83 in parallel to a rotation axis of the holding drum 70 in a sub scan direction, and the position of the optical head 10 is detected by an encoder 84. In other words, a moving mechanism including the motors 81 and 82 and the ball screw 83 moves the outer surface of the holding drum 70 and the recording material 9 relatively to the optical head 10 (and the light from the special light modulator) at a constant speed in the main scan direction and also, the scanning mechanism moves them relatively to the optical head 10 in the sub scan direction crossing the main scan direction.

The motors 81 and 82, the encoder 84, and the optical head 10 are connected to a general control part 21, which controls the motors 81 and 82 and emission of light from the spatial light modulator in the optical head 10 to record an image on the recording material 9 held on the holding drum 70 by light.

Data of an image to be recorded on the recording material 9 is prepared in a signal generation part 23 in advance, and a signal processing part 22 receives an image signal outputted from the signal generation part 23 on the basis of a control signal from the general control part 21. The signal processing part 22 converts the image signal into a signal for the optical head 10 to input the signal to the general control part 21, and then a voltage representing the image signal is applied to each light modulator element of the spatial light modulator by control of the general control part 21.

Figure 2:
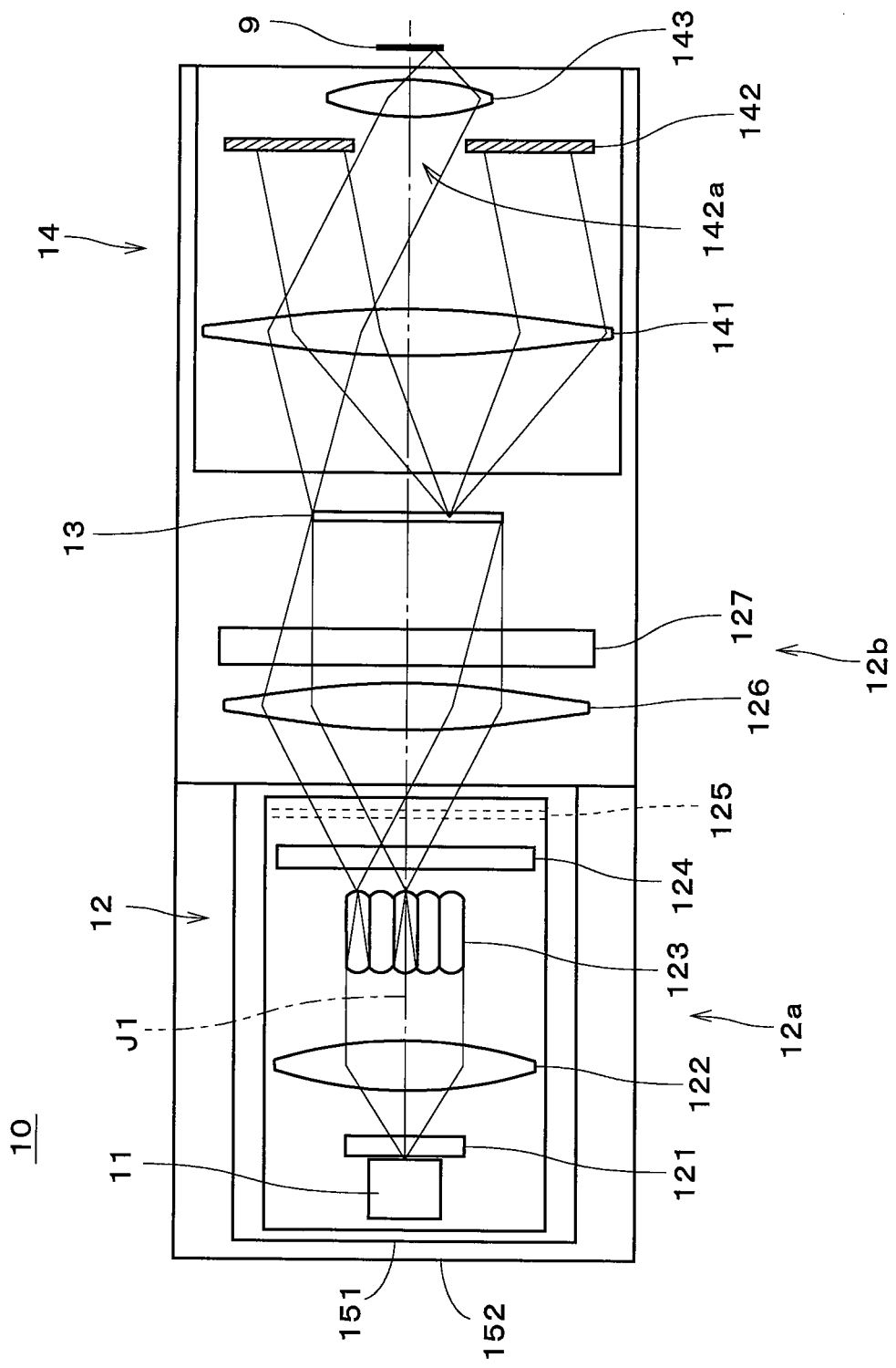
FIGS. 2 and 3 are a plan view and a side view each showing an optical head which is expanded.
Figure 3:
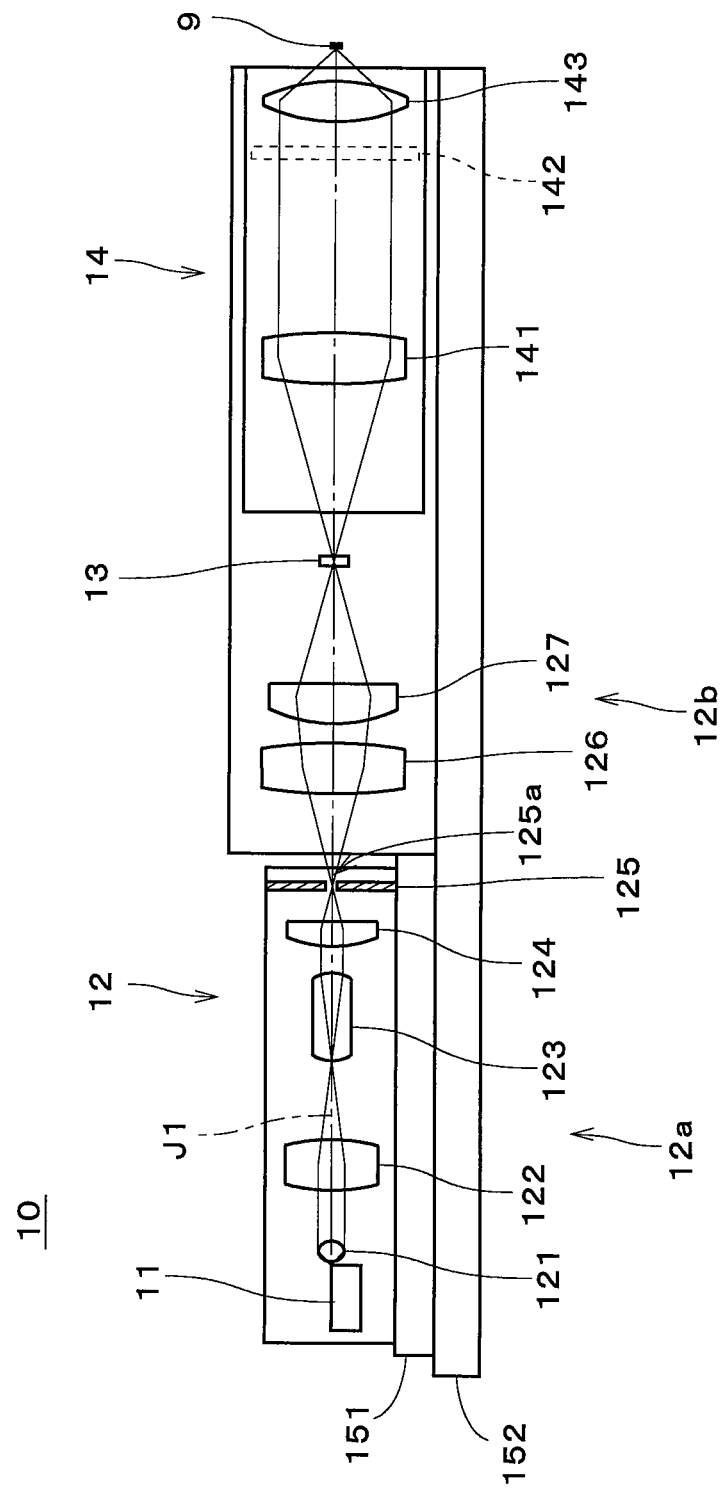

FIGS. 2 and 3 are a plan view and a side view each showing the optical head 10 which is expanded along the optical axis. FIGS. 2 and 3 are not the accurate plan view and side view, in which three-dimensional arrangement of optical elements are ignored.

The optical head 10 has a laser light source 11, an illumination optical system 12, a spatial light modulator 13, and an image forming optical system 14 in this order from the left of FIGS. 2 and 3. A laser light emitted from the laser light source 11 is converted into a linear illumination light in the illumination optical system 12 and directed to the spatial light modulator 13. A light which is spatially modulated by the spatial light modulator 13 is directed to the recording material 9 through the image forming optical system 14. The laser light source 11 is a semiconductor laser, and may be one semiconductor laser or a plurality of semiconductor lasers. In the case of the plurality of semiconductor lasers, laser lights emitted from them are superimposed. Further, the laser light source 11 may be a semiconductor laser having a plurality of light emitting points arranged in a vertical direction of FIG. 2. As the illumination optical system, can be used a homogenizing optical system in which an array lens disclosed in Japanese Patent Application Laid-Open No. 2002-72132 is used as a homogenizer, and the entire content of which is incorporated herein by reference.

Figure 4:
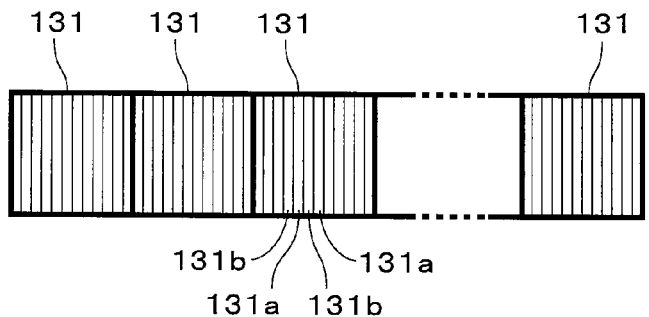
FIG. 4 is a view showing a spatial light modulator.

FIG. 4 is an enlarged view of a plurality of light modulator elements 131 in the spatial light modulator 13. The light modulator elements 131 are arranged in one direction (hereinafter, referred to as "element arrangement direction") in the spatial light modulator 13. A section of the linear illumination light has a linear shape which is long in the element arrangement direction, and the linear illumination light is directed onto the plurality of light modulator elements 131. Each light modulator element 131 is a diffraction grating whose grating depth is changeable, and it is manufactured with the semiconductor device manufacturing technique. In each light modulator element 131, a plurality of moving ribbons 131a and a plurality of fixed ribbons 131b are alternately arranged in parallel in the element arrangement direction, and each of the ribbons 131a, 131b has a strip shape which is elongated in a direction perpendicular to the element arrangement direction. The moving ribbons 131a are vertically movable relatively to a base surface therebehind, and the fixed ribbons 131b are fixed with respect to the base surface. As the light modulator element with diffraction grating structure, for example, the GLV (Grating Light Valve) (trademarked by Sillicon Light Machine, Sunnyvale, Calif.) is well known.

Figure 5A:
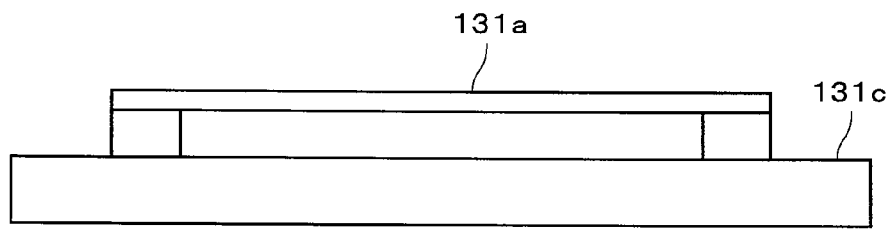
FIGS. 5A and 5B are side views of a light modulator element.
Figure 5B:
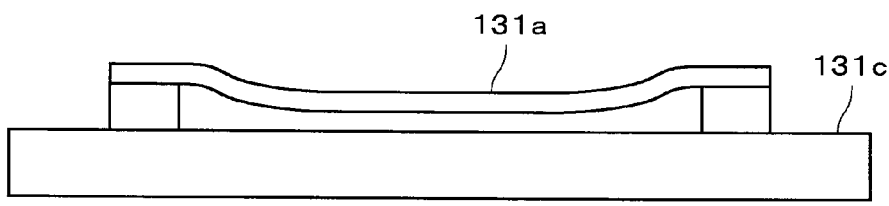

FIGS. 5A and 5B are side views of the moving ribbons 131a as viewed from the element arrangement direction. The upper surface of the moving ribbon 131a is a strip-like moving reflective surface which is parallel to a base surface 131c (i.e., the upper surface of a substrate) and is elongated in the direction perpendicular to the element arrangement direction. FIG. 5A shows an initial state where the moving ribbons 131a are not sagged, and FIG. 5B shows a state where a voltage (electric potential difference) is applied between the moving ribbons 131a and the base surface 131c and the moving ribbons 131a are sagged toward the base surface 131c by electrostatic force. Both end portions of the moving ribbons 131a are supported, and center portions of the moving ribbons 131a are made closer to the base surface 131c by sagging.

The fixed ribbon 131b has the same structure as the moving ribbon 131a shown in FIG. 5A. The upper surface of the fixed ribbon 131b is a strip-like fixed reflective surface which is parallel to the base surface 131c (i.e., the upper surface of the substrate) and is elongated in the direction perpendicular to the element arrangement direction. However, the fixed ribbons 131b do not sag.

Figure 6A:
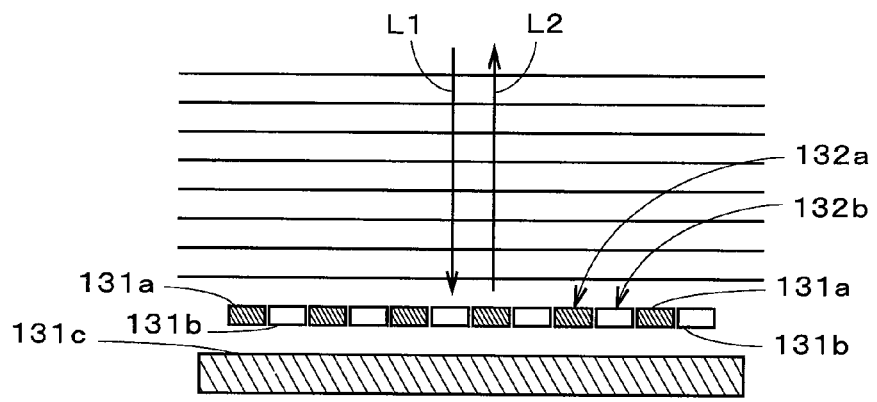
FIGS. 6A and 6B are cross-sectional views of the light modulator element.
Figure 6B:
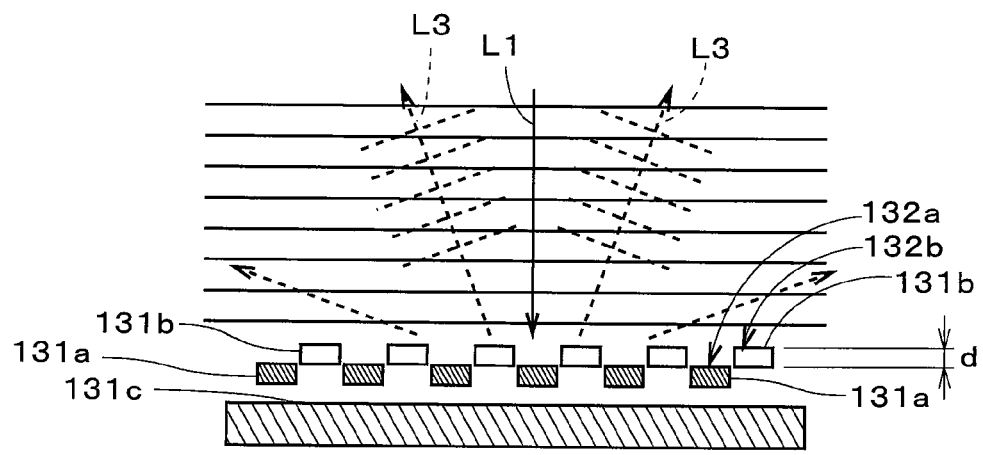

FIGS. 6A and 6B are views each showing a cross section of the light modulator element 131 which is cut by a plane perpendicular to the moving ribbons 131a and the fixed ribbons 131b. As shown in FIG. 6A, the moving ribbon 131a and the fixed ribbon 131b have the approximately same width, and the moving ribbons 131a and the fixed ribbons 131b are arranged at regular pitches. In a state where moving ribbons 131a are not sagged as shown in FIG. 6A, the height of a moving reflective surface 132a from the base surface 131c is equal to that of a fixed reflective surface 132b from the base surface 131c. In this state, a zeroth order diffracted light (which is a normally reflected light, and hereinafter referred to as a "zeroth order light") L2 with the maximum light amount (i.e., the maximum intensity) is outputted from the light modulator element 131 by reflection of an incident light L1. On the other hand, FIG. 6B is a view showing a state where the moving ribbons 131a are sagged and a difference d of the heights between the moving reflective surfaces 132a and the fixed reflective surfaces 132b is $((2n-1)/4)\lambda$ ($\lambda$ is a wavelength of an incident light and n is a positive integer). In the state of FIG. 6B, a light amount (light intensity) of (+/−) first order diffracted lights L3 (further, high odd-order diffracted lights) outputted from the light modulator element 131 is maximum, and a light amount of the zeroth order light is minimum.

FIGS. 6A and 6B show a state where the incident light L1 enters perpendicularly to the base surface 131c, however, the incident light actually tilts along a plane which is perpendicular to the base surface 131c and parallel to the direction of extending the ribbons. First order diffracted lights are emitted in a case where the difference between an optical path through the moving reflective surfaces 132a and an optical path through the fixed reflective surfaces 132b fulfills $((2n-1)/2)\lambda$. Therefore, in the case of incident angle θ, the difference of heights between the reflective surfaces 132a and 132b is $((2n-1)/4)\lambda \cos\theta$. This is also applied to the case of FIG. 9B which is discussed later.

As discussed above, the height of the fixed reflective surfaces 132b from the base surface 131c is almost equal to that of the moving reflective surfaces 132a from the base surface 131c in the state where moving ribbons 131a are not sagged. The height of the moving reflective surfaces 132a from the base surface 121c is changed by sagging the moving ribbons 131a in accordance with an inputted voltage, to change the light modulator element 121 between the state of emitting the zeroth order light and that of emitting the first order diffracted lights. Actually, the moving ribbons 131a are slightly sagged so that light amounts of zeroth order lights from all the light modulator elements 131 are accurately equal in a state where each light modulator element 131 emits a zeroth order light.

Although a spatially modulated light is generated by reflection of the illumination light in the spatial light modulator 13, bending of the optical path J1 by reflection of the light on the spatial light modulator 13 is ignored in FIGS. 2 and 3 as described above.

The illumination optical system 12 has a slit member 125, and an optical system between the slit member 125 and the laser light source 11 is hereinafter referred to as a "first optical system 12a" and an optical system between the slit member 125 and the spatial light modulator 13 is referred to as a "second optical system 12b".

The first optical system 12a has a collimating lens 121, a lens 122, a fly-eye lens 123, and a cylindrical lens 124 in this order from the laser light source 11. A laser light emitted from the laser light source 11 is collimated in the vertical direction of FIG. 3 by the collimating lens 121, and a collimated light is directed to the lens 122. The light is made parallel with respect to the vertical direction of FIG. 2 (hereinafter, referred to as "horizontal direction") by the lens 122, and is converged in the vertical direction of FIG. 3. The "horizontal direction" is a direction which is perpendicular to the optical axis J1 and corresponds to the arrangement direction of the light modulator elements 131, and the "vertical direction" is a direction which is perpendicular to both of the optical axis J1 and the horizontal direction. The vertical direction here is not required to correspond to the direction of gravity.

The light passing through the lens 122 is divided into five segments in the horizontal direction by the fly-eye lens 123, where the light is parallel with respect to the vertical direction, and the light is converged in the vertical direction by the cylindrical lens 124. The slit member 125 has a slit 125a which is a horizontally long opening, and the light from the cylindrical lens 124 is most converged at the position of the slit 125a. In other words, an intermediate image position is provided between the laser light source 11 and the spatial light modulator 13 in the illumination optical system 12, and the slit member 125 is positioned at the intermediate image position. An intermediate image of the laser light source 11 is formed at the position of the slit 125a. Formation of the intermediate image is only in the vertical direction, and the intermediate image is made elongated in the horizontal direction by the fly-eye lens 123.

The second optical system 12b has a lens 126 and a cylindrical lens 127 in this order from the slit member 125. The light divided in the horizontal direction by the fly-eye lens 123 passes through the slit 125a and is accurately superimposed in the horizontal direction at the position of the spatial light modulator 13 by the lens 126, to make a distribution of light amount (i.e., a distribution of light intensity) uniform. With respect to the vertical direction, the intermediate image is reformed at the position of the spatial light modulator 13 by the lens 126 and the cylindrical lens 127, to thereby generate a linear illumination light. Reformation of the intermediate image may be performed only in the vertical direction.

The image forming optical system 14 has a lens 141, a light blocking member 142, and a lens 143 in this order from the spatial light modulator 13. The lens 141 is provided with a function for forming a far-field image (a distribution in angle) of the spatial light modulator 13 at the light blocking member 142. The light from each light modulator element 131 is separated into a zeroth order light, first order lights, and high order lights at the light blocking member 142. A center clearance 142a of the light blocking member 142 is designed to pass only the zeroth order light, and the zeroth order light emitted from each light modulator element 131 in the spatial light modulator 13 passes through the center clearance 142a of the light blocking member 142 by the lens 141 to be directed to the recording material 9 through the lens 143. With this structure, an image (actually, dot) of the light modulator element 131 is formed on the recording material 9. On the other hand, the first order diffracted lights from the light modulator element 131 are directed to the light blocking member 142 by the lens 141 and blocked there. As a result, a spatially modulated light which is a group of zeroth order lights is directed to the recording material 9, and a group of images (actually, dots) of the light modulator elements 131 are written on the recording material 9. In the light modulator element 131, the state of emitting the zeroth order light is an ON state where writing is performed on the recording material 9, and the state of emitting the first order diffracted lights is an OFF state where writing is not performed on the recording material 9. In other words, the zeroth order light is a signal light for recordation of an image.

Figure 7:
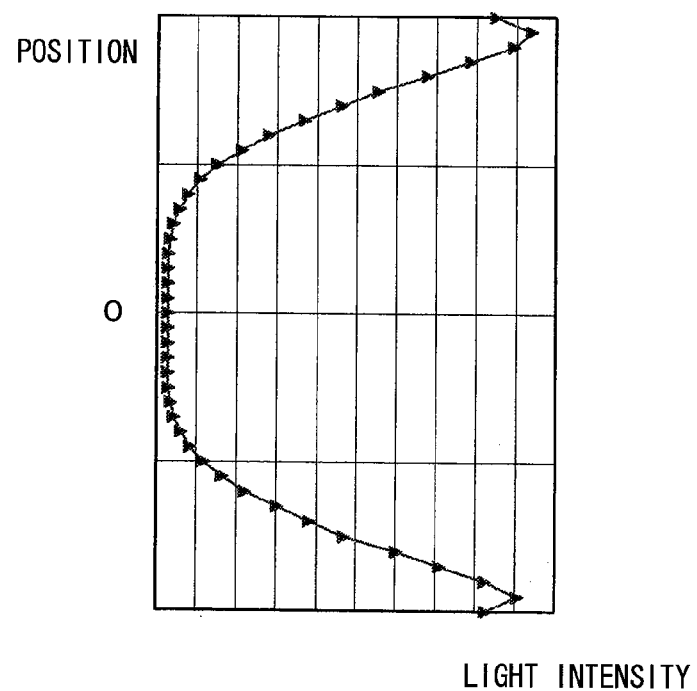
FIG. 7 is a graph showing a intensity distribution of a zeroth order light emitted from a light modulator element in a state where first order diffracted lights are emitted.

Next discussion will be made on a function of the slit member 125. FIG. 7 is a graph showing a light intensity (reflection intensity) distribution of a zeroth order light from a light modulator element 131 in a state where the first order diffracted lights are emitted. The vertical axis in FIG. 7 represents position on the light modulator element 131 in the direction of the ribbons, and 0 represents the optical axis J1 or a center position in the vertical direction on the light modulator element 131. The horizontal axis represents the light intensity distribution (reflection intensity distribution) in a direction where the zeroth order light is diffracted (reflected) in a case where a light is uniformly irradiated onto the whole of the light modulator element 131. As shown in FIG. 7, in the state where the first order diffracted lights are emitted, a light intensity of the zeroth order light is increased in the vicinities of both end portions of the moving ribbons 131a and the fixed ribbons 131b in the light modulator element 131. Conversely, emission of the zeroth order light is fully suppressed in a certain range in the center of the moving ribbons 131a and the fixed ribbons 131b, while the first order diffracted lights are emitted. This phenomenon occurs because an amount of sagging of the vicinities of the both end portions of the moving ribbons 131a is smaller than that of the center portions thereof and the center portions are sagged in a state almost parallel to the base surface 131c, as shown in FIG. 5. In the following description, an area of the moving ribbons 131a where an amount of sagging is constant is referred to as an "effective area". In FIG. 7, the range of the vertical axis is 200 μm, and the width of the effective area is 70 μm.

If the vertical width of the linear illumination light irradiated to the spatial light modulator 13 (actually, the vertical width is the width of an irradiation area since the linear illumination light enters the spatial light modulator 13, being tilted) is out of range of the width of the effective area, the zeroth order light emitted from an area outside the effective area is directed to the recording material 9 even if the light modulator elements 131 are in the OFF state. This results in deterioration in contrast (i.e., an ON/OFF ratio which is an extinction ratio of a signal light).

If the linear illumination light irradiated on the effective area is generated only by using lenses, very high surface accuracy and positioning accuracy of the lenses are required and this increases the manufacturing cost of the optical head 10. In particular, the collimating lens 121 (also called as a FAC (Fast Axis Collimator) lens) which is closest to the laser light source 11 requires the very high surface accuracy and the positioning accuracy.

Figure 8A:
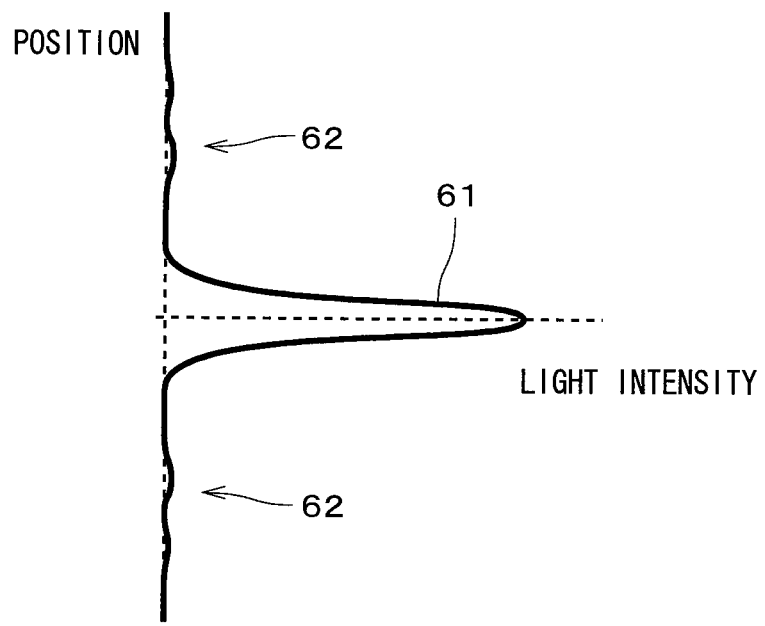
FIG. 8A is a graph showing a light intensity distribution at a position of a slit.

FIG. 8A is a graph showing a light intensity distribution at the position of the slit 125a in a case where an optical system is adjusted at practical cost. The vertical axis represents position in the vertical direction and the horizontal axis represents light intensity. As shown in FIG. 8A, although a sharp peak occurs at the center in the vertical direction since the intermediate image of the laser light source 11 is formed in the vertical direction, and side lobes 62 appear on the both sides of a main lobe 61 (i.e., on the both sides of the main lobe 61 in the vertical direction) because of influence of the first optical system 12a. However, depending on a structure of the first optical system 12a, there may be a case where a side lobe appears on only one side of the main lobe, and yet another case where an undesired light which doesn't have a bump form like the side lobe, but slightly broadens from the main lobe appears. Hereinafter, such various undesired lights other than those appear in the main portion of the main lobe are collectively called as an "undesired light", and lights corresponding to the main lobe are referred to as a "main beam".

Figure 8B:
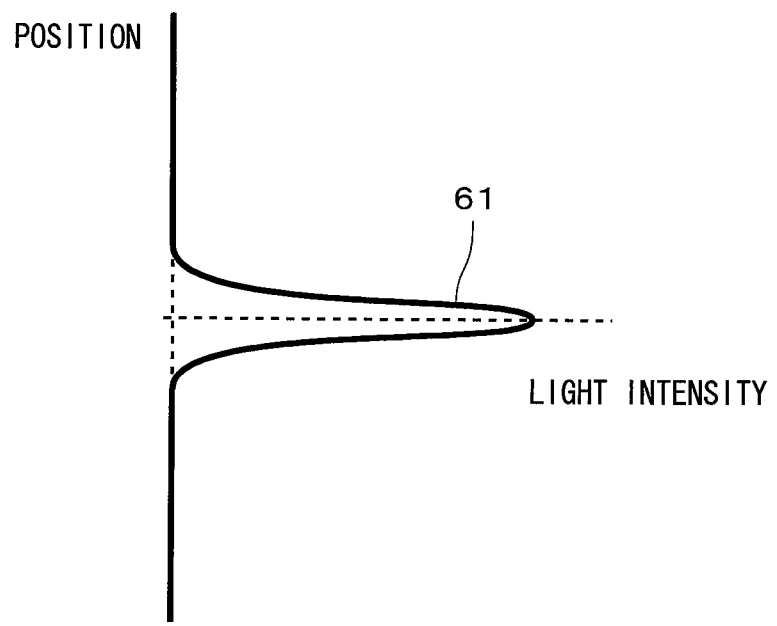
FIG. 8B is a graph showing a light intensity distribution after light has passed through the slit.

The slit 125a is provided within a range of the main beam in order to block the undesired light. With this structure, the light including only the main lobe 61, i.e., the main beam, is directed to the second optical system 12b as shown in FIG. 8B, and the linear illumination light without the undesired light is irradiated to the spatial light modulator 13. Consequently, it is possible to prevent the undesired light from being irradiated to areas other than the effective areas of the light modulator elements 131 in the OFF state and to prevent decrease in contrast of the signal lights. That is, a spatially modulated light with high quality is generated in the spatial light modulator 13.

As discussed above, the linear illumination light which is suitable for the spatial light modulator of diffraction grating type can be generated without expensive optical elements in the optical head 10, which is an apparatus for generating the spatially modulated light, to achieve high performance at low cost. Also, since a beam width relative to each light modulator element in the direction perpendicular to the element arrangement direction is limited, the form of the beam is made uniform and the linear illumination light with high quality is acquired to thereby obtain a recorded image with high quality.

In a case where the recording material 9 has reciprocity failure, i.e., there is a difference between the sensitivity of the recording material 9 in high-speed recording with high illuminance and that in low-speed recording with low illuminance because the recording material 9 is quickly exposed if an amount of irradiated light excesses a constant amount, the influence on image recording by the undesired light is limited without providing the slit 125a. However, in a case where the recording material 9 has less reciprocity failure, i.e., the amount of irradiated light and the degree of sensitivity are almost proportional, the influence by the undesired light such as the side lobe is outstanding. As described above, the optical head 10 including the slit member 125 is especially suitable for recording an image on the recording material 9 with less reciprocity failure.

Since the fly-eye lens 123 which is a part of optical elements (the fly-eye lens 123 and the lens 126) for making the distribution of light amount uniform in the horizontal direction is not provided in the second optical system 12b but in the first optical system 12a, the light from the complicated first optical system 12a is directed to the slit 125a to simplify the second optical system 12b. As a result, it is possible to suppress decrease in quality of the linear illumination light by the second optical system 12b. All the optical elements for making the distribution of light amount uniform in the horizontal direction may be provided in the first optical system 12a. As an optical element for making the distribution of light amount uniform, other homogenizer such as a DOE element (a diffractive optical element) or a rod lens can be used.

Next discussion will be made on a mechanism for attaching and detaching a part of the illumination optical system 12. As shown in FIGS. 2 and 3, the laser light source 11 and the first optical system 12a and the slit member 125 of the illumination optical system 12 are fixed on a holding member 151. Actually, these optical parts are supported by various supporting members provided on the holding member 151. On the other hand, the second optical system 12b, the spatial light modulator 13, and the image forming optical system 14 are attached on a large-sized base 152 which is placed on a base part of the image recording apparatus 1, as appropriate, with interposing a supporting member. The position of the holding member 151 is easily determined to the base 152 (i.e., to the second optical system 12b), being easily attachable and detachable by screws or the like.

As discussed above, in the optical head 10, the laser light source 11, the first optical system 12a, and the slit member 125 are attachable to and detachable from other portions including the second optical system 12b as a unit which is fixed on the holding member 151. With this structure, adjustment or change of optical parts from the light source to the portions for forming the intermediate image can be easily performed by detaching these parts. Also, in exchanging parts, since these optical parts are easily detached and exchanged, it is possible to easily maintain a state where no deterioration in contrast or the like occurs. As described above, the optical axis J1 is bent at the position of the spatial light modulator 13 and the like, so the form and arrangement of the base 152 are different from that shown in FIG. 3.

Figure 9A:
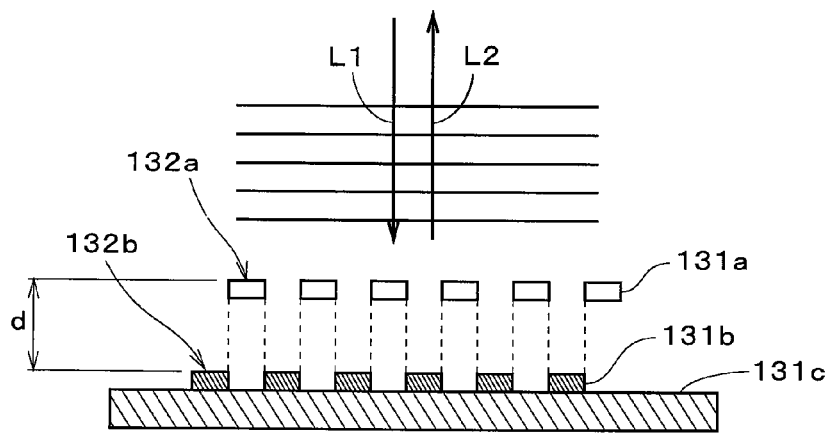
FIGS. 9A, 9B, and 9C are cross-sectional views each showing another example of the light modulator element.
Figure 9B:
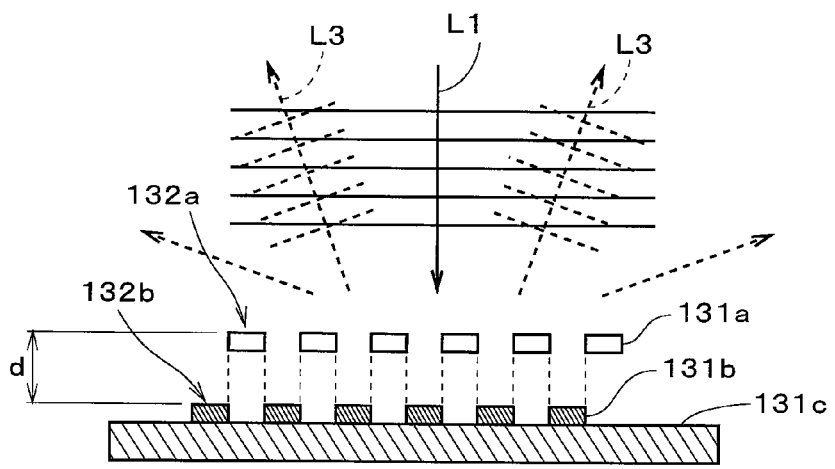

FIGS. 9A and 9B are another example of the light modulator element 131, showing cross sections corresponding to FIGS. 6A and 6B, respectively. In the light modulator element 131 according to another example, the upper surface of the moving ribbons 131a are the strip-like moving reflective surfaces 132a which are parallel to the base surface 131c and elongated in the direction perpendicular to the element arrangement direction. The fixed ribbons 131b are fixed on the base surface 131c, and their upper surfaces are the strip-like fixed reflective surfaces 132b which are parallel to the base surface 131c and elongated in the direction perpendicular to the element arrangement direction.

FIG. 9A shows a state where moving ribbons 131a are not sagged (the moving ribbons 131a may be slightly sagged). In the light modulator element 131 in this state, a difference d of the heights between the moving reflective surfaces 132a and the fixed reflective surfaces 132b is $(2n/4)\lambda$, and a light amount of the zeroth order light L2 from the light modulator element 131 is maximum, and a light amount of the first order diffracted lights is minimum. As discussed above, in the case where the illumination light enters at an incident angle θ, the difference d of heights is $(2n/4)\lambda \cos\theta$ (the same is applied to FIG. 9C).

FIG. 9B shows a state where a voltage (electric potential difference) is applied between the moving ribbons 131a and the base surface 131c and the moving ribbons 131a are sagged toward the base surface 131c by electrostatic force. In FIG. 9B, the moving ribbons 131a are sagged, and a difference d of the heights between the moving reflective surfaces 132a and the fixed reflective surfaces 132b is $((2n+1)/4)\lambda$. As a result, the (+/−) first order diffracted lights L3 with the maximum light amount (and further high-order diffracted lights) are outputted from the light modulator element 131. The zeroth order light is emitted in a state where sagging of the moving reflective surfaces 132a doesn't exist (or is small) and the first order diffracted lights are emitted in a state where sagging of the moving reflective surfaces 132a is large.

In the light modulator element 131, the moving reflective surfaces 132a and the fixed reflective surfaces 132b are positioned at different heights from the base surface 131c in a state where the signal light, i.e., the zeroth order light, is emitted. In such a light modulator element 131, since there are no clearances between the moving reflective surfaces 132a and the fixed reflective surfaces 132b when viewed from the direction perpendicular to the reflective surfaces, it is possible to further enhance the contrast of the signal light.

Also in the spatial light modulator 13 having the light modulator elements 131 shown in FIGS. 9A and 9B, the slit 125a is provided and the linear illumination light without the undesired light is irradiated to the spatial light modulator 13. Thus, it is possible to prevent the undesired light from being irradiated to an area other than the effective area of the light modulator element 131 in the OFF state, and a spatially modulated light with high quality is thereby generated in the spatial light modulator 13.

Figure 9C:
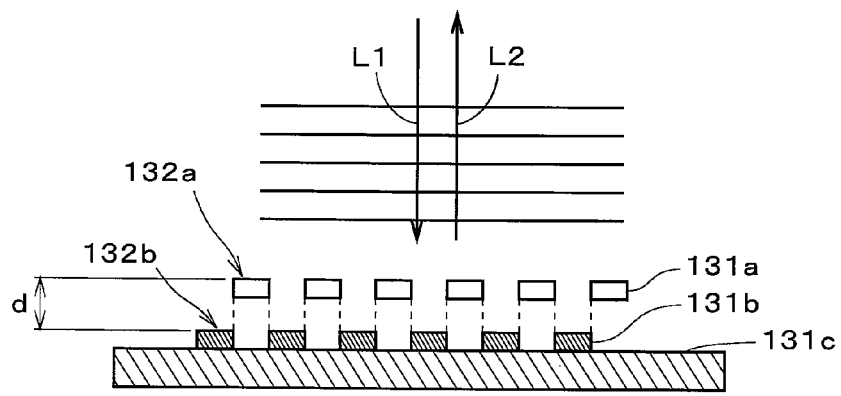

In the image recording apparatus 1, may be used a light modulator element which emits the first order diffracted lights L3 shown in FIG. 9B in a state where moving ribbons 131a are not sagged or the moving ribbons 131a are slightly sagged. In this case, the zeroth order light L2 is emitted in a state where the moving ribbons 131a are further sagged as shown in FIG. 9C. In such a light modulator element 131, a difference d of heights between the reflective surfaces 132a and 132b is $((2n−1)/4)\lambda$ in the state of FIG. 9B, and the difference d is $(2n/4)\lambda$ in the state of FIG. 9C.

When the light modulator element 131 changing between FIG. 9B and FIG. 9C is used, the first order diffracted lights may serve as the signal lights for writing in the image recording apparatus 1. Also in this case, the moving reflective surfaces 132a and the fixed reflective surfaces 132b are positioned at different heights from the base surface 131c in a state where the signal light is emitted. When the first order diffracted lights are used as the signal lights, a light blocking member for blocking the zeroth order lights on the optical axis J1 to pass the first order diffracted lights which travel to a direction apart from the optical axis J1 is provided instead of the light blocking member 142 of FIG. 2. Then, a group of (+/−) first order diffracted lights is collected on the recording material 9 as a spatially modulated light, by a large lens behind the light blocking member.

In the light modulator element 131, since the moving ribbons 131a are sagged in the state of emitting the zeroth order light, when all the elements are irradiated in the state of emitting the zeroth order light, a distribution of light intensity of the first order diffracted lights in the vertical direction is according to that illustrated in FIG. 7. Therefore, in a case where writing is performed with the light modulator elements 131 shown in FIGS. 9B and 9C in which the first order diffracted lights serve as the signal light, an undesired light is blocked by the slit member 125 to thereby acquire the signal light with high contrast at low cost, as illustrated in FIGS. 8A and 8B.

In a light modulator element 131 in which an amount of sagging of the moving reflective surfaces 132a in a state where a signal light is emitted is smaller than that in a state where no signal light is emitted, removal of undesired light from the illumination light greatly contributes to improvement of contrast of the signal light. However, normally, the moving reflective surfaces 132a are made slightly sagged for adjustment of light amount even in a state where the signal light is emitted, as discussed earlier. Therefore, also in a light modulator element 131 emitting a signal light in a state where an amount of sagging of the moving reflective surfaces 132a is large (a light modulator element emitting a non-signal light in FIG. 9A and emitting a signal light in FIG. 9B or a light modulator element emitting a non-signal light in FIG. 9B and emitting a signal light in FIG. 9C), removal of undesired light by the slit member 125 contributes to improvement of contrast of the signal light.

Figure 10:
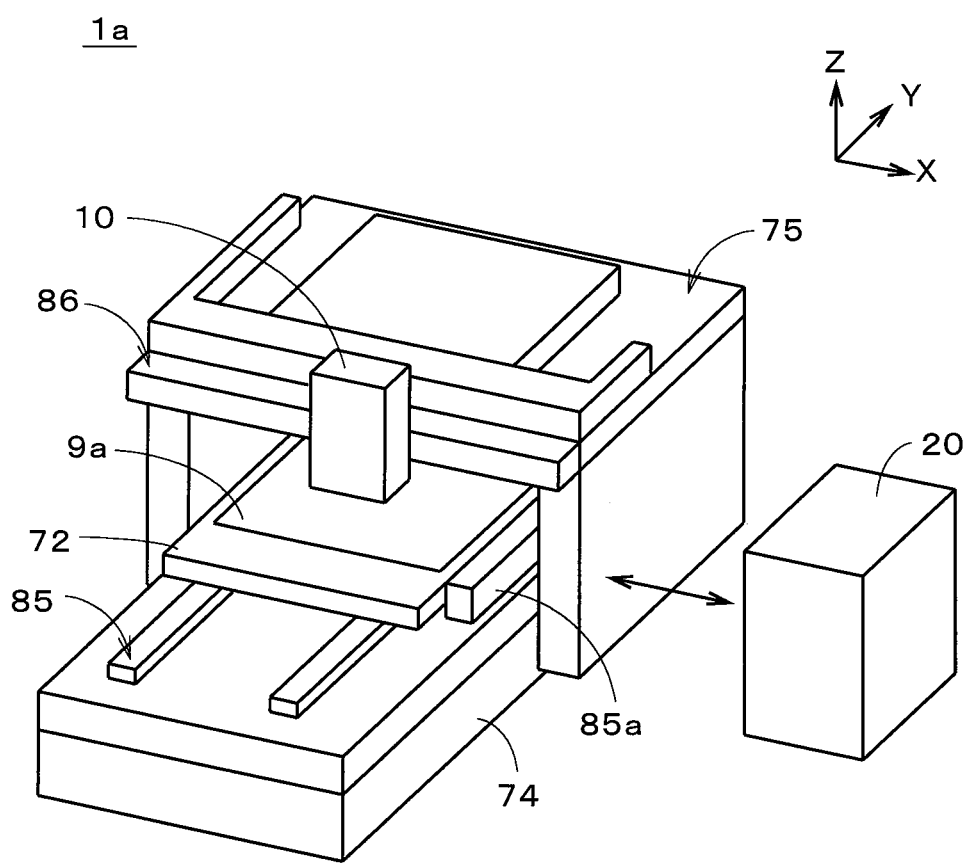
FIG. 10 is a perspective view showing another example of the image recording apparatus.

FIG. 10 is a perspective view showing another example of the image recording apparatus. A control unit 20 in an image recording apparatus 1a is provided with a general control part 21, a signal processing part 22, and a signal generation part 23 of FIG. 1.

The image recording apparatus 1a is an apparatus for recording an image of a pattern such as mask or conductive wire on a glass substrate 9a for manufacturing a glass mask, a TFT (Thin Film Transistor) liquid crystal panel or the like, and it is a so-called direct writing apparatus for directly writing an image by irradiation with light. In the image recording apparatus 1a, the glass substrate 9a coated with a photosensitive material is a recording material for recording information of an image. The image recording apparatus 1a has a table 72 for holding the glass substrate 9a on its surface on the (+Z) side and a table moving mechanism 85 for moving the table 72 in the Y direction (main scan direction) is fixed on a base part 74. A position detecting module 85a for detecting position of the table 72 is provided on the base part 74.

An optical head 10 for emitting light toward the glass substrate 9a is located above the table 72 and the optical head 10 is movably supported by a head moving mechanism 86 in the X direction which is the sub scan direction. That is to say, the main scan direction and the sub scan direction are parallel to the horizontal table 72, and the table moving mechanism 85 and the head moving mechanism 86 function as a mechanism for moving the table 72 relatively to the optical head 10 including a spatial light modulator at a constant speed in the main scan direction and also moving the table 72 relatively to the optical head 10 in the sub scan direction perpendicular to the main scan direction.

A frame 75 is attached to the base part 74 over the table 72 and the head moving mechanism 86 is fixed on the frame 75. The basic structure of the optical head 10 is the same as that shown in FIGS. 2 and 3, and the slit member 125 is provided at the intermediate image position in the illumination optical system 12. A film of photosensitive material (i.e., resist) to be photosensed by irradiation with ultraviolet rays is previously formed on the main surface of the glass substrate 9a on the (+Z) side in this preferred embodiment. Though the arrangement direction of the plurality of light modulator elements 131 (see FIG. 3) in the spatial light modulator 13 provided in the optical head 10 corresponds to the sub scan direction which is the X direction, the arrangement direction of the plurality of light modulator elements 131 do not necessarily have to correspond to the sub scan direction only if the arrangement direction is a direction crossing the main scan direction which is the Y direction. In other words, the main scan direction which is the moving direction of the glass substrate 9a has only to be a direction crossing the arrangement direction of positions irradiated with light, similarly to the case of FIG. 1.

When an image is recorded on the glass substrate 9a, first, the table 72 is moved relatively to the optical head 10 in the (−Y) direction by the table moving mechanism 85 and irradiation positions of light from the optical head 10 are thereby continuously moved relatively to the glass substrate 9a in the (+Y) direction (i.e., main scanning is performed). In parallel with movement of the table 72, emission of signal lights is performed in synchronization with a signal outputted from the position detecting module 85a. With this operation, writing is performed on a strip-like region (swath), extending in the Y direction, with a width corresponding to the size of image of spots of the spatial light modulator.

When the irradiation positions reach an end of the glass substrate 9a on the (+Y) side, the optical head 10 moves in the sub scan direction (X direction) by a distance corresponding to a width of the strip-like region in the X direction, the moving direction of the table 72 is reversed, and then writing in a backward path of the table 72 is performed on a new strip-like region in contact with the side of the strip-like region written in a forward path. Then, the optical head 10 intermittently moves in the X direction while reciprocally moving the table 72 in the Y direction, to record an image on the whole writing area of the plane glass substrate 9a in the image recording apparatus 1a.

In the image recording apparatus 1a, since the slit member 125 is provided at the intermediate image position in the illumination optical system 12, it is possible to achieve improvement of contrast of the signal lights at low cost. As a result, a quality of an image to be recorded can be easily enhanced.

Though the preferred embodiments of the present invention have been discussed above, the present invention is not limited to the above-discussed preferred embodiments, but allows various variations.

The moving ribbons 131a and the fixed ribbons 131b are not limited to a ribbon shape in a strict meaning. For example, the fixed ribbons 131b may be block-shaped portions whose upper surfaces are fixed reflective surfaces.

The laser light source 11 is not limited to a semiconductor laser but may be a gas laser, a solid laser, or the like.

The recording material 9 and the glass substrate 9a can be moved by other techniques only if they are movable relatively to the optical head 10. The recording material may be material coated with photosensitive material such as a printed circuit board or a semiconductor substrate, other material with photosensitivity, or material which responds to heat by light irradiation.

While the invention has been shown and described in detail, the foregoing description is in all aspects illustrative and not restrictive. It is therefore understood that numerous modifications and variations can be devised without departing from the scope of the invention. This application claims priority benefit under 35 U.S.C. Section 119 of Japanese Patent Application No. 2009-219465 filed in the Japan Patent Office on Sep. 24, 2009, the entire disclosure of which is incorporated herein by reference.

REFERENCE SIGNS LIST 1, 1a image recording apparatus
9 recording material
9a glass substrate
10 optical head
11 laser light source
12 illumination optical system
12a first optical system
12b second optical system
13 spatial light modulator
81, 82 motor
83 ball screw
85 table moving mechanism
86 head moving mechanism
123 fly-eye lens
125 slit member
125a slit
131 light modulator element
131c base surface
132a moving reflective surface
132b fixed reflective surface
151 holding member

The invention claimed is:

1. An apparatus for generating a spatially modulated light, comprising:
 a laser light source;
 a spatial light modulator having a plurality of light modulator elements which are arranged in an element arrangement direction; and
 an illumination optical system for generating a linear illumination light from a light emitted from said laser light source, said linear illumination light being directed onto said plurality of light modulator elements, a section of said linear illumination light having a linear shape which is long in said element arrangement direction, wherein
 each light modulator element of said plurality of light modulator elements has strip-like moving reflective surfaces and strip-like fixed reflective surfaces which are elongated in a direction perpendicular to said element arrangement direction and are alternately arranged in said element arrangement direction,
 said moving reflective surfaces are sagged in a state where both end portions of said moving reflective surfaces are supported, and said each light modulator element changes between a state of emitting a zeroth order light and a state of emitting first order diffracted lights, to generate a group of signal lights, each of which is a zeroth order light or first order diffracted lights, from said plurality of light modulator elements, as a spatially modulated light, and
 said illumination optical system comprises:
 a first optical system for forming an intermediate image of said laser light source at an intermediate image position between said laser light source and said spatial light modulator, said intermediate image being formed with respect to a vertical direction which is a direction perpendicular to a horizontal direction corresponding to said element arrangement direction and perpendicular to an optical axis, said intermediate image being long in said horizontal direction;
 a slit member positioned at said intermediate image position and having a slit extending in said horizontal direction, said slit member blocking an undesired light which appears on both sides or one side of said intermediate image in said vertical direction; and a second optical system for reforming said intermediate image onto said spatial light modulator with respect to at least said vertical direction with using a light passing through said slit, to generate said linear illumination light, and said apparatus further comprising a holding member for holding said laser light source, said first optical system, and said slit member, and being attachable to and detachable from said second optical system.

2. The apparatus according to claim 1, wherein
said signal light is a zeroth order light, and
said moving reflective surfaces and said fixed reflective surfaces are positioned at substantially same height from a base surface which is parallel to said moving reflective surfaces and said fixed reflective surfaces in a state where said signal light is emitted in said each light modulator element.

3. The apparatus according to claim 1, wherein
said moving reflective surfaces and said fixed reflective surfaces are positioned at different heights from a base surface which is parallel to said moving reflective surfaces and said fixed reflective surfaces in a state where said signal light is emitted in said each light modulator element.

4. The apparatus according to claim 1, wherein
said first optical system has at least a part of optical elements for making a distribution of light amount of said intermediate image uniform in said horizontal direction.

5. The apparatus according to claim 1, wherein
an amount of sagging of said moving reflective surfaces in a state where a signal light is emitted is smaller than that in a state where said signal light is not emitted in said each light modulator element, and said linear illumination light is irradiated only to effective areas of said moving reflective surfaces, said effective areas being areas in which an amount of sagging is constant.

6. The apparatus according to claim 5, wherein
said signal light is a zeroth order light, and
said moving reflective surfaces and said fixed reflective surfaces are positioned at substantially same height from a base surface which is parallel to said moving reflective surfaces and said fixed reflective surfaces in a state where said signal light is emitted in said each light modulator element.

7. The apparatus according to claim 5, wherein
said moving reflective surfaces and said fixed reflective surfaces are positioned at different heights from a base surface which is parallel to said moving reflective surfaces and said fixed reflective surfaces in a state where said signal light is emitted in said each light modulator element.

8. The apparatus according to claim 5, wherein
said first optical system has at least a part of optical elements for making a distribution of light amount of said intermediate image uniform in said horizontal direction.

9. An image recording apparatus for recording an image on a recording material, comprising:
a light generating apparatus for generating a spatially modulated light; and
a moving mechanism for moving said spatially modulated light from said light generating apparatus relatively to a recording material, said spatially modulated light being irradiated onto said recording material, wherein said light generating apparatus comprises:
a laser light source;
a spatial light modulator having a plurality of light modulator elements which are arranged in an element arrangement direction; and
an illumination optical system for generating a linear illumination light from a light emitted from said laser light source, said linear illumination light being directed onto said plurality of light modulator elements, a section of said linear illumination light having a linear shape which is long in said element arrangement direction, each light modulator element of said plurality of light modulator elements has strip-like moving reflective surfaces and strip-like fixed reflective surfaces which are elongated in a direction perpendicular to said element arrangement direction and are alternately arranged in said element arrangement direction, said moving reflective surfaces are sagged in a state where both end portions of said moving reflective surfaces are supported, and said each light modulator element changes between a state of emitting a zeroth order light and a state of emitting first order diffracted lights, to generate a group of signal lights, each of which is a zeroth order light or first order diffracted lights, from said plurality of light modulator elements, as a spatially modulated light, said illumination optical system comprises:
a first optical system for forming an intermediate image of said laser light source at an intermediate image position between said laser light source and said spatial light modulator, said intermediate image being formed with respect to a vertical direction which is a direction perpendicular to a horizontal direction corresponding to said element arrangement direction and perpendicular to an optical axis, said intermediate image being long in said horizontal direction;

a slit member positioned at said intermediate image position and having a slit extending in said horizontal direction, said slit member blocking an undesired light which appears on both sides or one side of said intermediate image in said vertical direction; and a second optical system for reforming said intermediate image onto said spatial light modulator with respect to at least said vertical direction with using a light passing through said slit, to generate said linear illumination light, and said light generating apparatus further comprises a holding member for holding said laser light source, said first optical system, and said slit member, and being attachable to and detachable from said second optical system.

10. The image recording apparatus according to claim 9, wherein
said signal light is a zeroth order light, and
said moving reflective surfaces and said fixed reflective surfaces are positioned at substantially same height from a base surface which is parallel to said moving reflective surfaces and said fixed reflective surfaces in a state where said signal light is emitted in said each light modulator element.

11. The image recording apparatus according to claim 9, wherein
said moving reflective surfaces and said fixed reflective surfaces are positioned at different heights from a base surface which is parallel to said moving reflective surfaces and said fixed reflective surfaces in a state where said signal light is emitted in said each light modulator element.

12. The image recording apparatus according to claim 9, wherein
said first optical system has at least a part of optical elements for making a distribution of light amount of said intermediate image uniform in said horizontal direction.

13. The image recording apparatus according to claim 9, wherein
an amount of sagging of said moving reflective surfaces in a state where a signal light is emitted is smaller than that in a state where said signal light is not emitted in said each light modulator element, and
said linear illumination light is irradiated only to effective areas of said moving reflective surfaces, said effective areas being areas in which an amount of sagging is constant.

14. The image recording apparatus according to claim 13, wherein
said signal light is a zeroth order light, and
said moving reflective surfaces and said fixed reflective surfaces are positioned at substantially same height from a base surface which is parallel to said moving reflective surfaces and said fixed reflective surfaces in a state where said signal light is emitted in said each light modulator element.

15. The image recording apparatus according to claim 13, wherein
said moving reflective surfaces and said fixed reflective surfaces are positioned at different heights from a base surface which is parallel to said moving reflective surfaces and said fixed reflective surfaces in a state where said signal light is emitted in said each light modulator element.

16. The image recording apparatus according to claim 13, wherein
said first optical system has at least a part of optical elements for making a distribution of light amount of said intermediate image uniform in said horizontal direction.

* * * * *